United States Patent [19]
Rollins et al.

[11] Patent Number: 6,110,511
[45] Date of Patent: *Aug. 29, 2000

[54] FRUIT PARTICLE ANALOG

[75] Inventors: Gregory Rollins; John A. Fontana, both of Kansas City, Mo.

[73] Assignee: Cereal Ingredients, Inc., Kansas City, Mo.

[ * ] Notice: This patent is subject to a terminal disclaimer.

[21] Appl. No.: 09/225,663

[22] Filed: Jan. 5, 1999

Related U.S. Application Data

[63] Continuation-in-part of application No. 08/926,322, Sep. 5, 1997, Pat. No. 5,888,564, which is a continuation-in-part of application No. 08/641,680, May 1, 1996, Pat. No. 5,603,975, which is a continuation of application No. 08/414,280, Mar. 31, 1995, abandoned.

[51] Int. Cl.⁷ .............................. A23L 1/10; A23L 1/164; A23L 1/235; A23L 1/275
[52] U.S. Cl. ........................ 426/94; 426/103; 426/249; 426/250; 426/516; 426/650; 426/651; 424/409; 424/439; 424/493
[58] Field of Search .............................. 426/94, 103, 516, 426/650, 651, 250, 249; 424/409, 439, 493

[56] References Cited

U.S. PATENT DOCUMENTS

| | | | |
|---|---|---|---|
| 3,671,264 | 6/1972 | Drews et al. | 99/94 |
| 3,922,354 | 11/1975 | Galluzzi et al. | 426/96 |
| 4,112,125 | 9/1978 | Chesnut et al. | 426/250 |
| 4,451,488 | 5/1984 | Cook et al. . | |
| 4,710,386 | 12/1987 | Fulger et al. | 426/516 |
| 4,732,775 | 3/1988 | Millauer | 426/516 |
| 4,789,664 | 12/1988 | Seligson et al. . | |
| 4,790,996 | 12/1988 | Roush et al. | 426/516 |
| 4,828,846 | 5/1989 | Rasco et al. | 426/18 |
| 5,061,497 | 10/1991 | Thacker et al. | 426/31 |
| 5,082,673 | 1/1992 | Inglett . | |
| 5,106,634 | 4/1992 | Thacker et al. | 426/31 |
| 5,120,559 | 6/1992 | Rizvi et al. . | |
| 5,133,984 | 7/1992 | Murphy . | |
| 5,250,308 | 10/1993 | Alexander et al. . | |
| 5,332,585 | 7/1994 | Odermatt et al. | 426/516 |
| 5,395,623 | 3/1995 | Kovach | 426/28 |
| 5,403,610 | 4/1995 | Murphy et al. . | |
| 5,417,992 | 5/1995 | Rizvi et al. . | |
| 5,456,933 | 10/1995 | Lee . | |
| 5,554,402 | 9/1996 | Smith et al. . | |
| 5,718,931 | 2/1998 | Walter et al. . | |
| 5,888,564 | 3/1999 | Fontana | 426/94 |

*Primary Examiner*—Helen Pratt
*Attorney, Agent, or Firm*—Schwegman, Lundberg, Woessner & Kluth, P.A.

[57] ABSTRACT

The present invention is to an edible carrier for flavor or color or flavor and color. The edible carrier contains a starch-bearing material, a balking agent and a coloring or flavoring agent. The edible carrier has a texture ranging from soft to flinty and retains the coloring or flavoring agent when added to a high moisture medium such as a dough or batter.

33 Claims, No Drawings

FRUIT PARTICLE ANALOG

This application is a Continuation-In-Part of U.S. application Ser. No. 08/926,322, filed Sep. 5, 1997, now U.S. Pat. No. 5,888,564 which is a Continuation-In-Part of U.S. application Ser. No. 08/641,680 filed May 1, 1996, which issued into U.S. Pat. No. 5,603,975 which is a Continuation of U.S. application Ser. No. 08/414,280 filed Mar. 31, 1995, which is now abandoned.

FIELD OF THE INVENTION

The present invention relates to an extruded food particulate that is fabricated to have a variety of textures, flavors and colors and to a method for making the extruded food particulate.

BACKGROUND

Historically, adding material such as fresh fruit to a dough or batter or cereal in order to make a finished, cooked product has been performed with difficulty and frequently, unsatisfactory results. One problem associated with using fresh fruit or dry fruit is a difficulty in storage of the fruit. Fruits tend to be highly perishable and subject to microbial contamination. Some fruits require special storage conditions such as refrigeration. Dried fruits, such as raisins, require special pretreatment. The pretreatment includes softening by soaking in water for about one hour and then draining the water.

Another problem associated with using fruit is that processing fruit is difficult. Fresh fruit is comprised of a high concentration of water. For some processes, fresh fruit is added to a dough or batter, which may have a lower water concentration. As a consequence, the fresh fruit may bleed some of its color into the dough or batter, which is undesirable in some applications.

One other component of fruit that renders the fruit difficult to process is pectin. Pectin within a fruit is gummy, making any product prepared with a fruit having a high pectin concentration difficult to handle. In particular, the fruit is messy to handle. The fresh fruit with a high pectin concentration sticks to processing equipment.

Enzymes within the fruit may also render the fruit difficult to process. Some fruits are subject to enzymatic degradation when exposed to air, such as apples which turn brown. This susceptibility limits the usefulness of fruits such as apples in many baked goods.

Another problem with fruit is that fruit is expensive and, depending upon crop and weather conditions, may vary greatly in availability and quality. Furthermore, fresh fruit is, under some use circumstances, a limiting factor in a shelf life of a product that contains the fruit. When the fruit "goes bad," so does an otherwise shelf-stable baked product.

Particulate food products, having use as fruit analogs or other food analogs, have been made and used for several decades. One type of particulate food analog is prepared from a sugar-based formulation and is boiled as a candy. The step of boiling this food analog crystallizes the sugar, rendering the food analog irreversibly soft. When this type of food particulate is added to a dough or batter and then baked, the food particulate analog cannot withstand extended mixing of the batter or baking of the dough or batter. What occurs during mixing and baking is that a significant portion of the particulate disintegrates and "bleeds out" color that may have been added to the particulate. This feature of the particulate fruit analog is undesirable because the excessive "bleeding out" does not simulate the performance of the fresh or dehydrated food article.

For sugar-based food particulates that retain their integrity during a baking or cooking process, the final product outcome is also frequently undesirable in that the texture of the fruit analog is brittle and hard. These features are inconsistent with features of the food being simulated. One other problem with sugar-based particulate food analogs is that the analogs do not lend themselves to a uniform particle size when produced in bulk because the particles fracture. Specifically, it has not been possible to produce a particle size without also producing a high percentage of fines. In addition to fines, manufacture has produced a wide, unacceptable, variance of sizes in this type of product.

In one other production method, a food analog particulate is produced with a high fat content. This food is not generally regarded as fully satisfactory because, typically, a high fat food is not preferred by consumers.

The high fat food analog is made by pressing a high fat mixture through a sieve to make an individual particulate product. Size uniformity of the particulate product is better achieved through this type of pressing process. However, the particulate food pieces are high in fat and caloric content and do not maintain their integrity when they are added to a batter or dough, and mixed and then cooked or baked. Because the food analog particles have a high fat content, the particles do not withstand ambient temperatures during storage. As a consequence, these food particulates require special storage, such as refrigeration which is expensive and is not always available.

Furthermore, the high fat particles do not carry added flavors or colors very well. Due to the high fat content of the particles, the particles do not retain their discrete particle integrity when added to a dough or batter because of the thermal conditions required in order to bake the dough or batter. These high temperature conditions may occur during processes such as moulding, proofing and baking. As a consequence, a finished baked good that contains the high fat particulates is comprised of color stains and holes where the high fat piece once existed, but melted from the thermal conditions.

SUMMARY OF THE INVENTION

One embodiment of the present invention includes an edible carrier for color or for flavor and color. The edible carrier includes a starch-containing material, a balking agent and a coloring agent or a coloring and a flavoring agent. The edible carrier retains the coloring when the edible carrier is submersed in a water-containing matrix for an extended period of time and is cooked.

One other embodiment of the present invention includes an array of edible carrier particles of at least two different colors or colors and flavors. The edible carrier particles comprise a fill portion and a shell portion that enrobes the fill portion. The fill portion is comprised of flour and sucrose in a weight ratio of about 1:1. The shell portion is comprised of flour and sucrose in a weight ratio of about 2:1 flour to sucrose.

Another embodiment of the present invention includes a fruit particle analog. The analog comprises flour, a balking agent and a coloring agent or a coloring and a flavoring agent. The analog has a texture ranging from soft to flinty depending upon the ratio of flour to balking agent. The analog retains the color or flavor when added to a dough or a batter matrix.

Another embodiment of the present invention includes a chocolate chip analog. The chocolate chip analog comprises flour, sucrose in a concentration by weight of about 1:1 with the flour and a chocolate coloring and flavoring. The chocolate chip analog maintains its shape and retains its color when it is baked in a dough or a batter and is subjected to an elevated temperature.

One other embodiment of the present invention includes an edible array of carrier particles of color or color and flavor, such as confetti. The array comprises a first collection of edible carrier particles of substantially the same color wherein the particles comprise components of flour and sucrose in a weight ratio of 1:1. The edible array also comprises a second collection of edible particles of substantially the same color, the color being different from the first collection. The first collection and the second collection are mixed together to form the edible array.

Another embodiment of the present invention includes a nutraceutical or pharmaceutical carrier. The carrier comprises a starch bearing material, a balking agent and a nutraceutical or pharmaceutical. The nutraceutical or pharmaceutical is mixed with a starch containing material and the balking agent and is extruded to form a particle. The nutraceutical or pharmaceutical is substantially free of heat degradation once it is particulated.

Another embodiment of the present invention includes an edible composition. The edible composition includes a color or color and flavor carrier comprising a starch bearing material, a balking agent in a concentration of 1:1 by weight to the starch bearing material and a color agent or coloring and flavoring agent. The composition also includes a fluid medium that comprises water. The carrier is disposed within the fluid medium. The carrier has a crunchy texture that is maintained for at least about four weeks when disposed in the fluid medium.

One other embodiment of the present invention includes a method for making an edible color or flavor and color carrier. The method comprises providing a starch bearing material and adding a balking agent to the starch bearing material to form a mixture. Fat is added to the mixture in a quantity effective to convey the mixture through an extruder without generating a substantial quantity of heat. Flavor or color or flavor and color is added to the mixture. The mixture is extruded through a die to make an extrudate. The extrudate is cut to make the carrier.

Another embodiment of the present invention includes a method for making a chocolate chip analog. The method includes providing a starch bearing material and adding sucrose to the starch bearing material in a concentration ratio of about 1:1, of the starch bearing material to the sucrose to form a mixture. A chocolate color and flavor are added to the mixture. Fat is added to the mixture in a concentration effective to convey the mixture through an extruder without generating a substantial quantity of heat. The mixture is extruded to form an extrudate and the extrudate is passed through a die and cutter to form the chocolate chip analogs.

One additional embodiment of the present invention includes a method for making a parmesan cheese analog. The method comprises providing flour and a balking agent in a concentration of about 1:1 by weight, balking agent to flour to form a mixture. A parmesan flavor and color are added to the mixture. The mixture is extruded at low temperature to form an extrudate. The extrudate is ground to form the cheese analog.

One other method of the present invention includes a method for making bread with a color carrier in a bread machine. The method comprises providing a color carrier wherein the carrier comprises flour to sucrose in a ratio of at least about 2:1 to make a carrier with a flinty texture. The carrier is added to the bread machine. A dough is prepared in the bread machine so that the carrier is mixed with the dough. The dough is baked to make a baked product with a discrete carrier within the dough.

DETAILED DESCRIPTION

The present invention comprises a method for making a particulate food analog comprising providing the ingredients of flour or other starch bearing material, a sugar or gum-based balking agent, oil or other fat and a coloring agent and/or flavoring agent and/or nutraceutical and/or pharmaceutical. These ingredients are mixed in a mixer to form a premix which is transferred to a screw type extruder. Within the extruder, water is added to the mixture to hydrate the mixture at a concentration effective to create a homogeneous mixture that may be extruded.

The hydrated mixture is conveyed by a screw through the screw type extruder without an addition of an external source of heat. The hydrated mixture which is referred to herein as an "extrudate" has a dough-like consistency. Any temperature increase of the mixture is due to shear generated by the extruder. The outlet temperature typically ranges from about 80 degrees Fahrenheit to 110 degrees Fahrenheit. For some embodiments, the outlet temperature may be as high as 160 degrees Fahrenheit. Temperature rise of the mixture within the extruder is reduced by the fat ingredient which acts to "grease" the mixture through the extruder, thereby reducing shear and heat evolution. The fat concentration ranges from about 0 to 8 percent by weight of the mixture. Commonly employed fat concentration ranges from about 1 to 4 percent by weight of the mixture. Fat is added primarily for lubricity during extrusion. Fat may also be added in order to create a desired mouthfeel for some product embodiments.

The present invention also includes an extruded particulate product comprising a sugar or gum-based balking agent, flour, and a coloring agent formed, in one embodiment, at a temperature below the crystallization temperature of the balking agent. It is not required that these ingredients or that additional ingredients comprise a fiber component. Fiber may be derived from sources such as fruit, tuber, nut, cellulose, corn, rice, legume wheat and oat. The water activity of a dried product is low enough to retard microbial growth.

The term "flavor" or "flavoring" as used herein refers to an organoleptic agent in a form of an emulsion, concentrate, aqueous or oil soluble liquid or dry powder which may be added to the mixture either prior to extrusion or after extrusion. Flavorings include any fruit flavors such as berry flavors, apple, cherry, plum, raisin, banana, pear, peach, figs, dates and so on. Flavorings also include any nut flavors, as well as any sweet flavors such as chocolate, vanilla, caramel, butterscotch, lemon, cinnamon, graham, coconut flavors, mint, and so on. Flavorings additionally include any savory flavors such as all meat, game, fowl, fish, dairy, barbeque, smoke, pepper, and vegetable flavors. Flavorings also include any cheese flavors such as parmesan and cheddar.

The term "color" or "coloring agent" as used herein refers to natural or uncertified colors from natural sources or certified colors for the effect of color. In one embodiment, the colors include dyes, certified aluminum lakes or colors derived from a natural source. Coloring agents may be water based or oil based or dry. Coloring agents may be primary colors, blends of colors or discrete mixtures of colors, such as confetti.

The term "nutraceutical" as used herein refers to edible materials having or believed to have medicinal effects. Nutraceuticals include the tocopherals, B vitamins, ginseng, wheat grass and barley grass and extracts of the grasses, soy-based estrogen analogs, black cohash, minerals, and so on. The method and product of the present invention are well suited to producing a carrier for materials such as nutraceuticals, that degrade when exposed to elevated temperatures.

The term "four" as used herein refers to a ground starch-based component of a grain in any form available from sources such as wheat, corn, oat, legumes such as soy, rice, tubers, psyllium or combinations of these materials.

The term "sugar or gum-based balking agent" as used herein refers to substantially all sugars and sugar substitutes, including any monosaccharide such as glucose or fructose, disaccharide such as sucrose or maltose, polysaccharide such as starch, oligosaccharide, or other carbohydrate forms such as gums that are starch-based, vegetable-based or seaweed-based.

The sugar or gum-based balking agents may, for some embodiments, impart a sweet flavor to the particulate. The sweet flavor may also be imparted or augmented by adding substantially any sugar substitute from any source of plant, mineral or animal or other synthetic source, such as Aspertame or saccharin.

The term "re-work" or "re-worked product" as used herein refers to extrudate of the present invention that is ground and extruded again, as necessary, with an addition of oil or fat, a balking agent, water and a coloring or flavoring agent to make another extruded product. Materials such as start-up waste, overs and unders, leftover material, and agglomerated by-products of the drying step are re-work ingredients.

The term "fat" as used herein refers to any animal or vegetable fat in solid or liquid form.

Upon exiting the extruder, the extrudate is passed through a die, is cut and is dried. The dried extrudate particles may be subjected to grinding or segregation as required for a final product specification. The temperature of the mixed, dough-like extrudate, within the extruder, in an instance where sucrose is used as the balking agent, remains below the crystallization point of the sugar. In one embodiment, colors or colors and flavors are added to the dough-like extrudate either prior to entrance to the extruder or with the water.

The method of the present invention may be performed using a single screw extruder. It is also believed that some embodiments of the method may be performed with a twin screw extruder or a former. It is believed that some embodiments of the method may be performed with a tableter or a positive displacement pump.

The method of the present invention makes a product having a predictable texture that functions as a superior carrier of color and flavor. In one embodiment, the sugar or gum based balking agent utilized is sugar in a form of sucrose. It has surprisingly been found that a ratio of sucrose-to-flour in a premix is determinative of the final texture of the extruded product, not only out of the extruder and after drying, but also in a final matrix such as a dough or batter or a cooked or baked lamellar- or crumb-structured material. A ratio by weight of 2:1 of sucrose-to-flour makes a particle that maintains its integrity in a dough or batter but changes during a process of baking or cooking the dough or batter. The change that the particle undergoes is characterized by a "bursting" of the particle and a partial dissolution of the sugar. Typically, the combined weight of sucrose and flour in the particle is at least about 75 percent by weight of the particle.

Increasing the ratio of sucrose-to-flour to greater than 2:1 makes a particle with sucrose that is so crystalline that the particle melts away in the product, leaving a point of color and/or flavor in a form of an air pocket where the particle had been. This type of particle simulates products such as candy. Particles with this ratio of sucrose-to-flour may be extruded at a higher temperature, greater than 110 degrees Fahrenheit.

The particles of the present invention may be made with "re-worked" extrudate to make a new extrudate product of the present invention. The re-extrusion is possible because of the very small temperature increase generated as a consequence of extrusion. The low temperature does not produce a significant chemical change, such as sucrose crystallization in premix constituents.

To use the re-worked extrudate, the extrudate particles are ground to a consistency within a range of size of flour particles and particles of the sugar or gum-based balking agent. The ground particles are added to the premix and are used as a substitute for either the flour or the balking agent or both the flour and the balking agent. The premix with the ground extrudate is introduced into the extruder and is then extruded to form a new extrudate product. Colorings or colorings and flavorings are added to the premix or the extrudate.

A particle made from a premix with a ratio by weight of 1:1 sucrose-to-flour makes a particle that has stability outside of a dough or batter, within a dough or batter for long-term storage, such as six weeks, and within a baked lamellar structure such as a bread or crumb structure such as a cake or cookies.

In another embodiment, the particle includes sucrose in a ratio of 1:1 to flour and a guar gum ingredient in a concentration of about 2.4 percent by weight of the premix. The addition of guar gum produces a particle with a tender texture. This particle may be sold separately for consumption or may be used in a particulate formulation such as "trail mix."

One specific embodiment of this type of particle is a chocolate flavored particle such as a chocolate chip. The chocolate chip particle of the present invention includes ingredients of chocolate in a form such as cocoa, flour, sugar, water sufficient to moisten the dry ingredients and oil or fat in a concentration that prevents a generation of significant heat within the extruder.

By "significant heat" is meant that the extrudate temperature does not exceed about 95 to 100 degrees Fahrenheit for most embodiments. This combination of the 1:1 sucrose-to-flour ratio and low extrusion temperature produces a condition whereby the sucrose remains below its crystallization point. It is believed that this chemical state of the sucrose renders the analog stable during long term storage and stable in matrices of high water concentration.

The chocolate chip analog of the present invention, unlike a conventional chocolate chip, has a very low fat concentration. Thus, the analog is of benefit to consumers watching their fat intake. Further, the chocolate chip analog does not melt when heated. This feature renders the analog stable in a dough or batter during storage. The addition of guar gum to the formulation renders the particle "tender" and singularly consumable.

A particle made from a premix having a weight-to-weight ratio of 1:2 sucrose-to-flour is usable in processing conditions that are extremely harsh, such as processing conditions in the making of bread with a bread machine. With this embodiment, the combined weight of sucrose and flour is at least about 75% of the weight of the particle. In bread machines used in the home, it is common for a baker to add all ingredients to the bread machine and to let the ingredients sit or mix for an extended period of time. The mixing process in the bread machine is harsh. If particles such as real blueberries, or raisins or cherries are added to the bread machine, the particles are ripped to shreds. The effect aesthetically is unsatisfactory to the consumer. Color from the fruit "bleeds" into the dough.

One embodiment of the particles of the present invention has a flinty consistency that permits the particles to retain their structural integrity even in the harsh conditions of mixing, proofing and baking in the bread machine. In the baked good, such as a baked bread, the particles acquire a softened or a chewy texture. Furthermore, the particles carry and "hold" color. The particles do not "bleed" color and do maintain their structural integrity in the dough and finished bread matrix. Guar gum may also be added to this particulate embodiment in order to "tenderize" the particulate. The guar gum may augment the sucrose or may substantially replace the sucrose. The particles of the present invention produce a bread with a good flavor, eye appeal, and extended shelf life.

The particle embodiment made with a 1:1 ratio of sucrose-to- flour actually softens in the crumb or lamellar matrix. Even though the particles undergo a substantial change in texture, From flinty to soft, the particles retain color or flavor. For some colors, particularly the aluminum lakes, the presence of water in the matrix hydrates the color and intensifies the color. This effect is unexpected because water would typically promote "bleeding" of the color, not intensification. The texture of this type of particle may be rendered more tender by an addition of guar gum. The guar gum concentration may be in a range of 1 to 3 percent.

It has surprisingly been found that adjusting the ratio of sucrose-to-flour not only predictably adjusts texture of the particles of the present invention but also produces excellent particulate carriers of color and flavor over the spectrum of textures. This result is surprising because it has conventionally been thought that multiple textures are obtained by completely different formulation strategies and extrusion strategies. Furthermore, it has been believed that water activity ranges need to be quite high in order to obtain certain textures. These high water activities are not conducive to carrying and maintaining color, particularly in another matrix of high water activity. The particles of the present invention do not have a high water activity, which increases their storage life. The particles do maintain full color, flavor and piece integrity, even after at least about four weeks of immersion in a matrix such as yogurt.

Irrespective of the type of texture imparted to the particle, the particle of the present invention displays an improved ability to carry color and a combination of flavor and color as compared to a fresh or dried fruit or other food. The particle does not bleed color unless color bleed is desired for particular products. The use of aluminum lakes substantially prevents the product from bleeding color when used in conjunction with the low extrusion temperature. As a consequence, reduced color and flavor agent concentrations may be employed to achieve superior results with respect to enhancement of the color and flavor. If bleeding is desired to some degree, color bleed can be controlled in batters, doughs or other materials of high water concentration such as yogurt. A predetermined degree of color dispersion is obtained by adjusting the concentration of dyes and dyes in combination with luminum lakes in the premix. In particular, the color is held fast by the particulate for some embodiments and is predictably dispersed in a dough or batter for other embodiments. The color composition and intensity may be altered with an addition of natural colors or dyes.

Because of these features, the particles of the present invention have use not only as fruit analogs but also as analogs for other types of foods. For instance, many consumers have allergies to foods such as shellfish and peanuts. The food analogs may be added to foods such as salads, soups, and pizza to impart a flavor and texture of the actual food without risk to the sensitized consumer.

The particle of the present invention may also be added to a food bar such as a sports bar or a granola bar, having a high concentration of carbohydrate or protein or fat. In this application, the particles may be fortified with nutraceuticals such as chromium picolinate, selenium, creatine, hormones and hormone analogs, zinc and other preparations that may be susceptible to degradation due to high temperature exposure.

The particles of the present invention may also be used either as pet or animal food or in pet or animal food formulations as analogs of meat, poultry or fish. The particles may also be used as or in pet food to carry nutriceuticals or medicine or growth-enhancing substances such as hormones. The particles have a versatility that permits use in dry pet food formulations and in wet formulations. The particles retain color, flavor, and textural integrity for the contemplated range of pet food formulations. Furthermore, because of the low temperature of extrusion, temperature sensitive ingredients may be blended with the premix to make the particles. For instance, the medicines or herbs or hormones may be incorporated into the particles, either with the colors and flavors of meat, poultry or fish or separately without detriment to their functionality.

In one embodiment, the particles are made by extrusion of a premix through a pitched screw configuration extruder. In particular, the screw has a pitch of about 90° closest to addition of the premix and an increasingly shallow and angled pitch approaching a die. The sugar, water, fat and flour are blended and "greased" through the extruder by a fat component. The fat component concentration is low because fat serves a function of reducing friction of the dough-like mixture in the extruder so that the mixture can be extruded without generating a substantial shear.

The screw is enclosed by jacketed barrels. The barrels define channels that in one embodiment have a spiral pitch. A use of the horizontal markings on the barrel tends to increase shear of the extrudate. For some particle embodiments, the jacketed barrels are cooled by running water at a temperature within a range of 1.5° C. to 22° C. through the barrels, thereby indirectly cooling the extrudate. In another embodiment, the jacketed barrels have no water running through them, producing an extrudate at an ambient temperature. In yet another embodiment, the jacketed barrels are heated by running water between 22° C. and 110° C. through the barrels in order to heat the extrudate.

Water that is added directly to the premix particles can be added at a temperature between about 1.5° C. and 110° C., thereby making it possible to obtain the same results in the extrudate as in cooling or heating jacketed barrels with water.

Processing aids may be added to particles in the premix prior to extrusion, or in the extrudate during extrusion. In one embodiment, flavor or color is dispersed in water or vegetable oil or other materials which are liquid or gas at ambient room temperature. The dispersed flavor or color is injected into the extruder at any point of the extruder by way of an inlet through the jacketed barrel. A processing aid such as carbon dioxide may be injected into the inlet of the extruder to have a desirable effect on the texture of the extrudate.

Other processing aids include monoglycerides, diglycerides and emulsifiers. These aids provide lubricity to the extrudate thereby supplementing fat in lubricating extrudate through the extruder. These aids also aid in dispersing a water phase and an oil phase and prevent "sticking" of an extrudate.

Once the extrudate is extruded, cut and dried to produce a particulate product, the product is homogeneous in nature. As the extrudate exits the extruder, the extrudate is pressed through a die plate. The die plate is at one end of the pitched screw. The die plate may be configured to define holes of variable diameter, depth and symmetry. The die plate may be fashioned with one or more holes by which the extrudate exits. The exit holes may be engineered to a variety of diameters and shapes. In one embodiment, the exit holes are uniform concentric circles having a diameter of about 4.75 millimeters.

Other embodiments include one or more concentric circles defined by the die ranging from 1.25 millimeters to 10 millimeters in diameter and the extrudate can be cut into lengths ranging from a fraction of a millimeter to 10 millimeters in length. In one embodiment, the exit holes are shaped like figures such as dinosaurs so that the extrudate takes on the shape of a dinosaur. Other shapes are possible, including geometric shapes, human and animal shapes, plant shapes and letters of the alphabet in a variety of sizes.

While the shape and diameter of the extrudate is determined by the shape and size of the exit hole in the die plate, the length of the extrudate particle is determined by a rotating knife or knives that are either internal or external to the die at the end of the die plate. As the extrudate exits the die plate in the diameter and shape that is determined by the die plate, the variable-speed knife or knives cut a specified length. The knife speed is determined by a rate at which the extrudate exits the die plate and by the length of the specific embodiment desired.

In one embodiment, the extrudate passes through a concentric circle-based die plate and knives that have a slight drag on the extrudate, thereby creating an oval shape of approximately one millimeter in length. In another embodiment, the extrudate takes a shape of a concentric circle or circles ranging From 1.25 millimeters to 10 millimeters. The extrudate is cut at a range of one millimeter up to 10 millimeters or more depending upon the desired application. The extrudate exits the extruder with a moisture content of about 2 to 20% by weight.

Once cut, the extrudate is transferred to a dryer to be dried to a desired moisture of between 2 to 20%. In one embodiment, the dryer is a fluidized stainless steel bed that the extrudate transfers through by way of vibration until the extrudate is at a desired moisture. In another embodiment, the dryer is a single or multistage dryer with perforated or non-perforated beds whereby each stage in the dryer may be set to different temperatures in order to temper the product properly to maintain discrete particles.

Although most sizes are achieved through the process of extrusion, it is possible to achieve the desired particle size by extruding a particle of 2 to 20 millimeters and then grinding, cutting, or otherwise fractionating this particle down to other sizes, thereby creating a variety of sizes and lengths. The particles may also be screened and segregated to a discrete and uniform particle size.

The extrudate product of the present invention offers an ease of storage handling and exceptional product shelf life. The product of the present invention may be stored for up to a year and one-half at ambient temperature and under normal storage conditions. Thus, the extrudate product of the present invention has superior shelf life when compared to the actual food being simulated.

Furthermore, for some embodiments, the extrudate of the present invention displays greater color and flavor delivery than the food being simulated. For instance, when a cheese flavored particulate was produced to a size of finely grated cheese, like that of pourable parmesan, and added to an entree, the cheese particulate had a much more intense coloi and flavor delivery than actual parmesan cheese. Because the particulate cheese did not melt away as a real cheese melts and retained its color, the cheese analog had a better eye appeal.

In another cheese embodiment, dried cheddar powder is added to the particle extrudate at a concentration of up to 30% by weight. The dried cheddar powder adds a creamy, tasty flavor and color of cheddar cheese to the particle. Additionally, the particle retains its original functionality of a reversible softness and structural integrity without melting away in a final food application. Thus, the cheddar particle of the present invention is a "hybrid" having desired organoleptic properties of cheddar and storage and integrity properties of the particle of the present invention.

One other unexpected embodiment of the present invention is a use of "natural" or uncertified colors in the particle of the present invention without bleeding into a dough or batter matrix or the baked product. In one embodiment, the colors are certified aluminum lakes or are from a natural source or a combination of the aluminum lakes and the natural source. With an appropriate ratio of flour-to-balking agent, such as about 1:1 sucrose-to-flour, the color may be held within the product to prevent the "bleeding" or leaching of added color. The color bleed is also controlled by adjusting the concentration of dyes and dyes in combination with aluminum lakes in the premix. Thus, when the colored particles are added to a white cake batter and baked, the baked cake displays a white crumb structure with points of color in a confetti pattern. The baked cake crumb structure was unaffected by the particles. In particular, a blend of colored particles was prepared with substantially equal amounts of all of the color varieties.

In another unexpected embodiment, the firm textured particles, having a sucrose-to-flour ratio of about 1:1, have been found to retain their crunchy texture, even when placed in a matrix of high water concentration, such as yogurt or frosting or ice cream, ice milk, sorbet, glace, or sherbet For a period of time of thirty days. The particles typically have a length and diameter of about 3 millimeters. Furthermore, these particles have retained their color during long term storage and have not "bled" color into the matrix.

In one other embodiment, an extruded particulate was cut to a length of about 6 millimeters. The particles initially had a somewhat hard texture. These particles were added to a fruit filling and were wrapped in a dough. Within the fruit filling, the particles softened but retained their structure. The dough was fried to make a fried pie. The fried pie had a soft fruit-like center.

In another embodiment, particles are fabricated by co-extrusion, and have a soft center but firm outer skin. These particles are made by passage of two formulations, one through a core and one through an annulus of a die plate. In one embodiment, the core material has a ratio of about 1:1 for sugar to flour. The annular material has a ratio of sugar to flour of about 2:1. These particles simulate a filled food, such as a candy. It is believed that particles may be fabricated that simulate other foods such as olives stuffed with jalapenos. The soft center of the particles may comprise a natural food such as cheese. The natural food is enrobed by the particle material of the present invention, thereby protecting the natural food that may be susceptible to damage resulting from exposure to harsh media.

Presented herein are examples of specific embodiments of the method and product of the present invention. These examples are intended to further describe the present invention and are not intended to limit the scope of the present invention.

EXAMPLE 1

Blueberry Flavored Particulate

A premix was prepared by combining sucrose in a concentration ranging from 35 to 55% by weight of the premix, wheat flour in a concentration of 40 to 60% by weight of the premix, and fiber in a concentration of 0 to 15% by weight of the premix. The mixture was transferred to a preconditioner. Water was metered into the mixture in an amount of about 9% by volume of the mixture.

The mixture was then gravity fed into an inlet of an extruder. The extruder was an E525 extruder manufactured by the Extru-Tech Company of Sabetha, Kans. The extruder setup comprised a preconditioner that fed the extruder. The extruder had a spiral screw configuration which was encased by spiral jacketed heads. The screw rotated at about 140 rpm. The extrudate was produced at or about ambient temperature. The barrels were heated or cooled in order to regulate the extrudate temperature.

Once fed into the extruder, the mixture was treated with another 6% of water by volume. The water was metered into the extruder. The resulting extrudate was a homogeneous particulate of the original ingredients. A die at the end of the screw included six concentric holes of ¼ inch diameter, equally spaced. Six knife blades rotated at about 800 rpm.

The cut particulates were then taken via air induction to the dryer. The particulates traveled through a fluidized bed dryer set at 240 degrees Fahrenheit for 30 minutes. The final moisture content of the product was about 6%.

One other embodiment of the process of the present invention includes mixing heterogeneous particles of sugar, flour, fat, a high fiber, high protein starch bearing cereal grain that includes a sugar mixture, with a flavoring emulsion and water to form a premix. The premix is extruded within a temperature range of about 75 to 250 degrees Fahrenheit. It is preferred that the temperature not exceed 160 degrees Fahrenheit. As the extrudate exits the extruder, the extrudate is cut to form particles. The homogeneous particles are transferred to an oven and are dried. In one embodiment, the extruded dried homogeneous particles are ground in a roller mill and are sifted to collect a desired homogeneous particle size distribution.

One other particle of the present invention includes farina in a concentration of about 98% by weight. The remaining weight includes a guar gum component. This particle is finely ground. The farina and guar gum are premixed and extruded at low temperature in an extruder as described to form an extruded product. The extruded product is cut, ground and dried. The ground, extruded product is hydrated in cold water at a ratio of 4:1 water to farina to form a gelatinized mixture that is thick and viscous. This gelatinized mixture has use in a batter. The gelatinized mixture also has use as a breakfast cereal.

The present invention also includes an extruded high fiber, high protein mixture of homogeneous particles having use as a food flavoring and as a texturizer. In one embodiment, homogeneous particles are ground and classified and are applied to an external surface of foods such as pastry, donuts, cookies and so on.

In another embodiment, homogeneous particles arc of a bite size and are blended with another particular food such as a breakfast cereal or snack food. A combination of the other particulate food and the bite size particles is a new food. The bite size particles flavor and texturize the new food. Depending upon the range of particle sizes, and ingredient proportions, the homogeneous particle mixture may confer a crunchy texture and mouthfeel to the food.

In one other embodiment, the homogeneous particles are each eaten as a high fiber, high protein snack. The flavor of this snack may be imparted by the flavor emulsion added to the mixture. The flavor may also be the natural flavor of the particle.

In one other embodiment, the particles are added to candy, such as a candy bar. In particular, the particles are added to a chocolate fraction of the candy. The particles may also be added to a nougat fraction of the candy. The particles impart a crunchy texture and mouthfeel to the candy bar.

In one other embodiment, the particles are added to a dough such as bread dough or cookie dough to simulate a natural particle such as a raisin. The particles may also be added to add a burst of flavor such as cinnamon or strawberry to the baked dough. It has surprisingly been found that the same particle can be used to impart either a crunchy mouthfeel, a firm mouthfeel or a soft mouthfeel.

Without undergoing softening, the bite-sized particles have a "flinty" mouthfeel. In one embodiment, an extruded raisin-flavored analog added to bread softens from the "flinty" mouthfeel to a simulated natural raisin texture. The change in texture occurs after sixty minutes of proofing the bread dough and baking for eighteen minutes in an oven at 455 degrees Fahrenheit. The "flinty" raisin analog does not soften to the same degree when added to a cookie dough and allowed to bake to 8–11 minutes in an oven at 380 degrees Fahrenheit, however.

By adding flour to the pre-extrusion formula, the hardness can be adjusted so that the end user obtains a raisin-like texture with a shorter baking time as is shown in Example 2. Adding additional fat to the pre-extrusion formula adjusts the hardness so that the end user obtains a raisin-like texture with a shorter baking time as shown in Example 3. A softer product can also be obtained by increasing the moisture level in the finished product to a maximum of about 15% to 18% by weight as shown in Example 2. One other way to soften a product includes reducing the concentration of sugar in a particular formulation as shown in Example 2.

The range in softness conferred by varying amounts of flour, fat, sugar, gums, and/or moisture is virtually limitless. As a consequence, the method of the present invention can be used to simulate an exceedingly wide range of textures.

Softness can be conferred to some particles, particularly small particles, without additional end user baking. For example, a crumb cake topping can be made having a soft mouthfeel without baking. The bite-sized particles are rendered susceptible to softening prior to addition to dough. The particles are rendered susceptible to softening by addition of fat, sugars and/or flour and gums and water to the heterogeneous mixture prior to extrusion.

Pre-treated homogeneous particles can retain a percent water of up to about 18 percent by weight and can be subsequently dried back to a percent moisture that is less than about 10 percent. Higher water concentrations may be used in conjunction with a preservative in order to reduce particle susceptibility to microbial growth. The particles re-hydrate and re-soften once added to dough.

The significant benefit of this water retention characteristic is that an end user can purchase the dried flavor particles in large quantities. The end user can use the particles at his or her leisure in a dough or other matrix where the particles will re-hydrate. The particles have a much longer shelf-life than the natural particles that they replace, such as raisins.

The homogeneous particles impart flavor to the food that in one embodiment is "nutty", caramel, and coconut. In one embodiment, toasted coconut particles are separately added to the homogeneous particles, after extrusion. It is also contemplated, however, that toasted coconut particles may be added to the homogeneous particles directly, before extrusion. The coconut is then captured within the particles during extrusion.

Other flavorings contemplated include fruit flavors such a blueberry, cherry, apple, dates, figs, raisins and so on, meat flavors such as chicken, beef, ham and so on, and savory flavors such as barbeque, smoke, pepper and so on and sweet flavors such as caramel, butterscotch, chocolate and so on. The flavors may be imparted as a liquid essence or as an atomized particle. Similarly to the coconut, the other flavorings may be separately added to the extruded homogeneous particles by spraying onto surfaces of the particles or maybe co-extruded with the particles.

As discussed, it is also contemplated that the extruded particles be usable without an additional imparted flavor. These particles have a natural flavor that may be sweet and "wheaty" in some applications and in other applications may be a non-sweet or "neutral" flavor. These particles may have a flavor that is caramel-like.

The homogeneous texturizing and flavoring particle mixture and process for making the homogeneous particle mixture of the present invention are improvements over existing particulate based flavoring and texturizing materials. In the process of the present invention, the ingredients are initially mixed to form a premix and the premix is subsequently extruded to form homogeneous particles.

Thus, flavoring and texturizing particles that have originally have heterogeneous physical properties of size, density, texture and flavor are reformed by extrusion into homogeneous flavoring and texturizing particles. The homogeneous particles are there by prevented from segregating into separate flavor particles and texturizing particles. Thus, the homogeneous particles of the present invention may be transported without substantial risk of particle segregation and without risk of substantial fines creation.

Some embodiments of the process and product of the present invention make use of a high fiber, high protein material. The high fiber, high protein material may be imparted with a flavoring and, when extruded with other particles, has use as a food for human consumption.

By the term "homogeneous particles," it is meant particles having substantially the same physical and chemical properties. A mixture of homogeneous particles is one where each particle has substantially the same flavor, texture or both flavor and texture. By the term "heterogeneous particles," it is meant particles having different physical and chemical properties. Each particle in a heterogeneous mixture may have a different flavoring or a different texture.

Unlike a conventional unextruded texturizing and flavoring mixture, the extruded homogeneous particles of the present invention may be either consumed whole or may be ground and classified to a desired, uniform size. In one embodiment, the homogeneous particles are formulated and are ground to a crumb size to make a softer product mixture. This added versatility permits the mixture of homogeneous particles to be adapted to more applications than conventional texturizing and flavoring mixtures. The versatility permits better coverage of a variety of food products by the mixture as compared to a conventional mixture of heterogeneous particles. This versatility also permits better blending with other food particles such as breakfast cereal and particulate snack foods.

It has surprisingly been found that by reforming the particles by extrusion to homogeneous particles, that the flavor, as determined organoleptically, is richer and has greater intensity in the homogeneous particle mixture than in heterogeneous particle mixtures made with the same ingredients. The finding is surprising because the mixture weight of an emulsion imparting flavors is the same for both heterogeneous and homogeneous particles. It has also been found that because of the richer and more intense flavor of the homogeneous particles, a significantly smaller quantity of ingredients such as toasted coconut, berries, bananas, apple and chocolate are required to be mixed with the ground homogeneous particle mixture to impart desired flavor and increase flavor intensity. This is desirable to consumers because some of these ingredients tend to be high in fat, calories and/or cholesterol. This may be desirable, also, because of a resulting lower cost. The particle of the present invention also permits multiple flavoring of individual particles.

It is believed that in the process of the present invention one or more flavorings are released and dispersed by extrusion into each of the homogeneous particles of the present invention. In one specific embodiment, the "nutty" flavor of the starch bearing cereal grain and imparted flavor of the flavor emulsion are blended into a single particle.

In addition to blending a flavoring with the premix, and blending extruded particles with a flavor particle such as coconut. The present invention also includes a step of spraying either droplets or atomized particles of flavoring on surfaces of extruded particles.

Because the particles of different sizes and densities are held in the single premix matrix which is extruded, and may be ground and classified, the final mixture of homogeneous particles has a uniform and narrow particle size distribution. Thus, the ground particle embodiment of the homogeneous mixture can provide improved coverage on a food such a donut, cereal particle, candy bar and ice cream bar.

As described, each of the extruded homogeneous particles is made from ingredients of flour, sugar, fat, a high fiber high protein starch cereal grain that includes sugar along with a flavoring emulsion, artificial color and water.

A preferred flour is wheat flour. Other flours such as corn flour, oat flour and rice flour are also suitable for use. Flour type may be selected to be compatible with another type of particles blended with the extruded particles such as corn flakes or oat bran.

In one preferred embodiment, the high fiber, high protein starch bearing cereal grain is prepared with 60% to 80% by weight of the starch converted to a soluble form and 4% to 30% of the weight converted to a caramel sugar mixture with 70% maltose and less than 5% glucose. The cereal grain is preferably wheat grain that is enzymatically converted to the soluble form. Other acceptable grains include rice, oats, corn, barley, sorghum, rye and combinations of these grains.

One cereal grain preparation suitable for use in the present invention is described in the Kovach patent U.S. Pat. No. 5,395,623, that issued on Mar. 7, 1995. This patent is herein incorporated by reference.

In one embodiment, the cereal grain described in the Kovach patent had a total dietary fiber of about 33% by weight and a protein concentration of about 27% dry weight. This cereal grain may be obtained in a process of producing alcohol from grain. This embodiment of the present invention imparts a product with a caramel flavor.

In one other embodiment, the high protein, high fiber cereal grain is also obtained in a process of producing alcohol from grain. In this embodiment, the cereal grain has an enzymatic starch conversion of 90% to 100%. Suitable cereal grains include wheat, corn, oats, rice, barley, sorghum, rye and combinations of these grains. The grains have a protein content range of 17% to 30%, on a dry matter basis. The grains have a total dietary fiber content on a dry matter basis of between 30% and 70% by weight and a nitrogen free extract content on a dry weight basis of less than 40%. The particles have a coating of residual sugars from the enzymatic conversion of starch which is 17% to 30% by weight on a dry weight matter basis.

In one other embodiment, the process and product are free of the high protein, high fiber cereal grain. Instead, the process and product include a conventional flour such as a wheat flour.

In one embodiment heterogeneous ingredients described were mixed and extruded in a Wenger extruder, Model No. X1-155, manufactured by the Wenger company of Sabatha Kans. The ingredients were mixed without steam addition. The extruder included a barrel that enclosed the screw with the diameter of 7.542 inches. The screw rotated at about 300 rpm within the barrel.

In one preferred embodiment, the extruder was fitted with a die at the outlet. The die had a face with holes, ranging in number from 2 to 8, each hole having a diameter of about one inch. Dies having holes ranging in diameter From 1/16 inch to 1 inch provided acceptable results. In one eight hole embodiment, the holes were positioned concentrically in the face.

At the outlet of the extruder, after the die, was a cutter of blade-type, rotating within a range of 200 to 2000 rpm. In one embodiment, the blade rotated at about 250 rpm. The cutter was rotated at an rpm speed to make homogeneous particles of a size that adequately dries in an oven to a moisture content of 3% to 6% weight. A knife cut the extruded mixture into homogeneous particles having a diameter of about one inch and a length of about 1/8 of an inch. The mixture did not puff as it exited the die.

In one embodiment, once the homogeneous particles were formed by the cutter, the particles were dried in a Wenger oven, manufactured by the Wenger Company of Sabatha Kans. The particles were preferably dried at about 225 degrees Fahrenheit for 5.3 minutes in a first chamber and dried at a temperature of 275 degrees Fahrenheit for 5.3 minutes in a second chamber.

Upon drying, the particles were cooled for about 10 minutes. Once cooled, in one embodiment, the homogeneous particles were transferred to a roller mill and ground to a desired size. Desired size is dependant upon the specific application.

The homogeneous product mixture was further refined by passing through a series of sieves. The sieve arrangement permitted "overs" be returned to the mill and fines to be collected and returned to the original pre-extrusion mixture. Homogeneous particles within a desired size range were sent to a holding bin.

For one embodiment, particles in the holding bin were mixed with a toasted coconut ingredient or packaged to make the extruded donut crunch product. It is contemplated that flavors other than coconut may be blended with the particle mixture of the present invention. Other flavors include chocolate, vanilla and strawberry, banana, apple and other berry flavors. Other non-fruit flavors suitable for use, such as meat savory flavors, have been described.

In another embodiment, particles are flavor analogs. In one embodiment, the analogs have a diameter of about 3/8 inches. It is understood, however, that analogs may be made in a wide range of sizes. The analogs may have a texture that ranges from firm to soft. The analogs may have a flavor intensity range of regular to high and may be flavored with artificial flavors, natural flavors or fruit flavors.

The flavoring and texturizing product of the present invention also includes a flaked product. Extruded particles prepared in the process described are transferred to a flaking mill where the particles are flaked. Next, the flaked particles are toasted in a toaster to a moisture of about 3% by weight. The flaked particles may alternately be dried in an oven, without toasting. In one embodiment, the toasted particles are then enrobed with a desired flavor and are cooled. Once cooled, the flakes are packaged. In another embodiment, the flaked particles are free from added flavor.

In one embodiment, the homogeneous particles were used to make a donut crunch. For application to a donut surface, having the following ingredients with the following weight percent:

| Formula | Weight Percent |
| --- | --- |
| granulated sugar | 41.44 |
| Shortening | 3.49 |
| Cereal grain | 10.61 |
| Wheat Flour | 30.58 |
| Coconut emulsion | 0.62 |
| Artificial color | 0.15 |
| Water | 7.49 |
| Toasted coconut | 5.62 |

To make the donut crunch, all ingredients were preblended in a horizontal mixture for about 5 minutes, except for shortening, water and coconut, to make a blended pre-mix. The shortening was melted in a separate vessel. The blended ingredients were transferred to a holding bin positioned above the extruder barrel. The blended ingredients were then transferred to a mixing chamber at an inlet of the extruder at a substantially uniform rate.

Once the uniform rate was achieved, water and melted shortening ingredients were metered into the mixing chamber to make a moistened mixture having the concentrations described above. The moistened mixture was transferred to the mixing chamber and into the extruder. No additional steam or water was introduced to the extruder.

As the mixture exited the extruder through the die, the mixture was cut into small homogeneous pieces. In one embodiment, the small homogeneous pieces were transferred onto a perforated band belt oven. The oven included two chambers that were each independently temperature controlled. The control permitted adjustments and retention time in each chamber. The crunch product was dried at 225 degrees Fahrenheit for 5.3 minutes in chamber 1 and at 275 degrees Fahrenheit for 5.2 minutes in chamber 2. The product was transferred through the chambers by a perforated band.

Once dried, the donut crunch product was cooled for ten minutes on the perforated band. The crunch product was transferred to a roller mill and ground to a desired size. A series of sifts following a roller mill classified the product. Overs were returned to the mill for further grinding. Fines were collected and returned to the initial pre-blended mixture for a second extrusion. Particles within the desired specification range were sent to a holding bin. Prior to packaging, toasted coconut was metered at a desired rate.

It has been found by adjusting flour and fat concentrations to high ends of the ranges described for the donut crunch product, and sugar concentration a low end of the range described for the crunch, a softer particle product is obtained. It is believed that this adjustment of ingredients may increase pore size within the particles and may also decrease thickness of walls enclosing pores as well as embrittle the walls.

EXAMPLE 2

A flavor analog of the present invention having a flinty mouthfeel that does not substantially soften was made with the following percent composition by weight:

| | | |
|---|---|---|
| Sucrose | 50.00% | by weight |
| Flour | 23.75% | |
| Water Absorption | 11.81% | |
| Other | 14.44% | |

Flavor analog particles having a soft texture and flavor analog particles being predisposed to having a soft texture have the following formulation:

| | | |
|---|---|---|
| Sucrose | 26.00% | by weight |
| Flour | 47.75% | |
| Water Absorption | 7.57% | |
| Other | 8.68% | |

Thus, to soften the particles, the sucrose was reduced by about one-half and the flour concentration was approximately doubled. The moisture absorption of the particles increased from about 11.8% of the total particle weight to 17.6% of the total particle weight. While particular proportions of sugar, flour and moisture absorption have been described, it is understood that other proportions can be used to achieve other degrees of softness.

EXAMPLE 3

One embodiment of the present invention made with the high fiber ingredient described in the Kovach patent, U.S. Pat. No. 5,395,623, is as follows:

| | | |
|---|---|---|
| Oil | 2.5% | by weight |
| Flour | 26.0% | |
| Sucrose | 45.0% | |
| Kovach Ingredient | 13.0% | |
| Water Absorption | 9.0% | |
| Other | 4.5% | |

This formulation produces a particle having a firm or flinty mouthfeel. The particle made by this formulation can be softened or predisposed to softening with the following formulation:

| | | |
|---|---|---|
| Oil | 4.5% | by weight |
| Flour | 24.5% | |
| Sucrose | 43.0% | |
| Kovach Ingredient | 15.0% | |
| Absorption | 10.0% | |
| Other | 3.5% | |

In this instance, the particle is softened by approximately doubling the oil concentration.

It is to be appreciated that the embodiments of the present invention have been described in particular detail with respect to preferred methods of making and structures. The present invention, however, is not intended to be limited to these embodiments. One skilled in the art will readily recognize that the embodiments may be adjusted to accommodate particular food particulate configurations.

What is claimed is:

1. A fruit particle analog for use in a dough or a batter matrix, consisting essentially of:
   a flour or a re-worked component;
   a balking agent selected from the group consisting of monosaccharides, disaccharides, polysaccharides, oligosaccharides and gum wherein the ratio of balking agent to flour is about 1:1 to about 2:1 by weight or greater; and
   a coloring agent, wherein the fruit particle analog retains the color of the coloring agent when added to the dough or batter matrix.

2. The fruit particle analog of claim 1 wherein the flour is selected from the group consisting of wheat, oat, soy or other legume, rice, tubers, psyllium or combinations of these materials.

3. The fruit particle analog of claim 1 wherein the balking agent is selected from the group consisting of glucose, fructose, and sucrose.

4. The fruit particle analog of claim 3 wherein the balking agent is sucrose.

5. The fruit particle analog of claim 4 wherein the sucrose is free of crystallization.

6. A fruit particle analog for use in a dough or batter matrix, consisting essentially of:
   a flour;
   sucrose wherein the ratio of sucrose to flour is greater than about 2:1 by weight; and
   fruit flavors selected from the group consisting of apple, cherry, plum, raisin, banana, all berries, pear, peach, figs and dates.

7. The fruit particle analog of claim 6 wherein the particle bursts when baked in a dough or batter matrix.

8. The fruit particle analog of claim 6 wherein the particle melts when baked in a dough or a batter matrix.

9. The fruit particle analog of claim 4 wherein the ratio of sucrose to wheat flour is less than 2:1 by weight.

10. The fruit particle analog of claim 9 wherein the particle is substantially unchanged when baked in a dough or a batter matrix.

11. The fruit particle analog of claim 1 wherein the color is an aluminum lake in a dry form or in a form dispersed in oil or water.

12. The fruit particle analog of claim 1 wherein the color is natural in a form that is dry or oil soluble or is water soluble.

13. The fruit particle analog of claim 1 that comprises a flavor that is selected from a group consisting of all berry flavors and all fruit flavors.

14. The fruit particle of claim 1 and further comprising one or more of a diglyceride, monoglyceride, or an emulsifier.

15. The fruit particle of claim 1 wherein the color is a dye in a dry form or in a form dispersed in oil or water.

16. A chocolate chip analog, consisting essentially of:
   flour;
   sucrose and, optionally, guar gum, in a weight concentration of about 1:1 to the flour; and
   a chocolate flavoring wherein the chocolate chip analog maintains its shape when baked in a dough or batter and subjected to an elevated temperature.

17. The chocolate chip analog of claim 16 wherein the analog further includes a fat in a concentration of less than 3% by weight.

18. The chocolate chip analog of claim 16 wherein the combined weight of sucrose and flour is at least about 75% of the weight of the analog.

19. An edible carrier for flavor or color or flavor and color for use in a water-containing matrix, consisting essentially of:
   a starch-containing material;
   a balking agent selected from the group consisting of monosaccharide, disaccharide, polysaccharide, oligosaccharide, and gum wherein the ratio of balking agent to starch-containing material is about 1:1 to about 2:1 by weight or greater; and
   a coloring or flavoring agent or coloring and flavoring agent, wherein the edible carrier retains the coloring and/or flavoring when the edible carrier is submersed in the water-containing matrix.

20. The edible carrier of claim 19 wherein the coloring agent is a dye in a dry form or in a form that is dispersed in water or that is dispersed in oil.

21. The edible carrier of claim 19 wherein the flavoring agent is selected from the group consisting of all berry flavors, all fruit flavors, all sweet flavors, vanilla, cinnamon, graham, coconut, all meat flavors all game flavors, all vegetable flavors, and all cheese flavors.

22. The edible carrier of claim 19 wherein the coloring agent is selected from the group consisting of natural colors, aluminum lakes and dye.

23. The edible carrier of claim 19 wherein the balking agent is sucrose.

24. The edible carrier of claim 23 wherein the ratio of starch-containing material to sucrose is 1:1.

25. The edible carrier of claim 19 and further including a medium high in moisture wherein the edible carrier is immersed in the medium.

26. The edible carrier of claim 19 wherein the edible carrier is immersed in the medium to make a pet food.

27. The edible carrier of claim 19 wherein the edible carrier is a component of pet food.

28. The edible carrier of claim 19 and further comprising one or more of a diglyceride, monoglyceride, or an emulsifier.

29. The edible carrier of claim 19 wherein the balking agent is selected from the group consisting of monosaccharide such as glucose and fructose, disaccharide such as sucrose and lactose, polysaccharide, oligosaccharide, and gum.

30. The edible carrier of claim 19 wherein the color is an aluminum lake in a dry form or in a form dispersed in oil or water.

31. An edible array of edible carrier particles of color or color and flavor, consisting essentially of:
   a first collection of edible carrier particles of substantially the same color and substantially the same size wherein the carrier particles comprise components of flour and sucrose in a weight ratio of 1:1; and
   a second collection of edible carrier particles of substantially the same color, different from the first collection, wherein the first collection and the second collection are mixed together to form the edible array.

32. A nutraceutical or pharmaceutical carrier, consisting essentially of:
   a starch containing material;
   a balking agent selected from the group consisting of monosaccharide, disaccharide, polysaccharide, oligosaccharide, and gum wherein the ratio of balking agent to flour is about 1:1 to about 2:1 by weight; and
   a nutraceutical or pharmaceutical mixed with the starch containing material and the balking agent to form a particle, wherein the nutraceutical or pharmaceutical is substantially free of heat degradation.

33. The carrier of claim 32 wherein the nutraceutical comprises wheatgrass or barleygrass or wheatgrass and barleygrass.

* * * * *

UNITED STATES PATENT AND TRADEMARK OFFICE
CERTIFICATE OF CORRECTION

PATENT NO. : 6,110,511
DATED : August 20, 2000
INVENTOR(S) : Rollins et al.

Page 1 of 1

It is certified that error appears in the above-identified patent and that said Letters Patent is hereby corrected as shown below:

Column 19,
Line 26, delete "balking" and insert --bulking--, therefor.
Line 44, delete "balking" and insert --bulking--, therefor.

Column 20,
Line 11, delete "balking" and insert --bulking--, therefor.
Line 32, delete "balking" and insert --bulking--, therefor.
Line 34, delete "balking" and insert --bulking--, therefor.
Line 37, delete "balking" and insert --bulking--, therefor.

Abstract, delete "balking" and insert --bulking--, therefor.

Signed and Sealed this

Thirty-first Day of July, 2001

Attest:

NICHOLAS P. GODICI
Attesting Officer
Acting Director of the United States Patent and Trademark Office